United States Patent [19]

Diethelm et al.

[11] Patent Number: 4,784,814

[45] Date of Patent: Nov. 15, 1988

[54] PRESSURE REACTION INJECTION MOLDING PROCESS FOR MAKING MOLDED BODIES OF THERMOSETS OPTIONALLY CONTAINING FILLER AND/OR REINFORCING MATERIAL

[75] Inventors: Hermann Diethelm, Giffers; Wolfgang Dresen, Rüfenacht, both of Switzerland

[73] Assignee: Ciba-Geigy Corporation, Ardsley, N.Y.

[21] Appl. No.: 881,987

[22] Filed: Jul. 3, 1986

[30] Foreign Application Priority Data

Jul. 11, 1985 [CH] Switzerland .................... 3002/85

[51] Int. Cl.⁴ .............................................. B29C 45/73
[52] U.S. Cl. .................................... 264/102; 264/327; 264/328.6; 264/328.8; 264/328.16; 264/328.18; 425/555
[58] Field of Search ............ 264/106, 102, 327, 328.12, 264/328.18, DIG. 83, 328.6, 328.8; 425/555

[56] References Cited

U.S. PATENT DOCUMENTS

| | | | |
|---|---|---|---|
| 2,136,423 | 3/1938 | Fields et al. | 18/55 |
| 3,619,449 | 11/1971 | Berard | 264/106 |
| 4,157,931 | 6/1979 | Bricot et al. | 264/106 |
| 4,249,882 | 4/1981 | Koch et al. | 425/547 |
| 4,338,068 | 9/1982 | Suh et al. | 425/144 |
| 4,350,739 | 9/1982 | Mohiuddin | 264/328.18 |
| 4,370,122 | 4/1983 | Dannels et al. | 425/543 |
| 4,439,386 | 3/1984 | Antczak | 264/328.18 |

FOREIGN PATENT DOCUMENTS 49-128098 12/1974 Japan .................... 264/327

OTHER PUBLICATIONS

Research Disclosure 217, May 1982 #21716.
Modern Plastics International, 11, 58 (11/83).

Primary Examiner—Jan H. Silbaugh
Assistant Examiner—Allan R. Kuhns
Attorney, Agent, or Firm—Harry Falber

[57] ABSTRACT

Molded bodies of thermoset material are produced from monomers, oligomers or higher pre-polymers of reactive resins by pressure reaction injection molding. The molded bodies may contain filler and/or reinforcing material. The process is carried out in a mold consisting of a first, preferably upper half mold and a second, preferably lower half mold, and an inlet socket opening downwardly into the first half mold. The mold is equipped with heating coils adapted for applying separately a lower temperature to the first half mold and a higher temperature to the second one. During the introduction and hardening phase of the reactive mixture, the first half mold is maintained at a lower temperature than the second half mold, the temperature difference amounts to about 40 to 180, and preferably 60 to 120 centigrades.

14 Claims, 2 Drawing Sheets

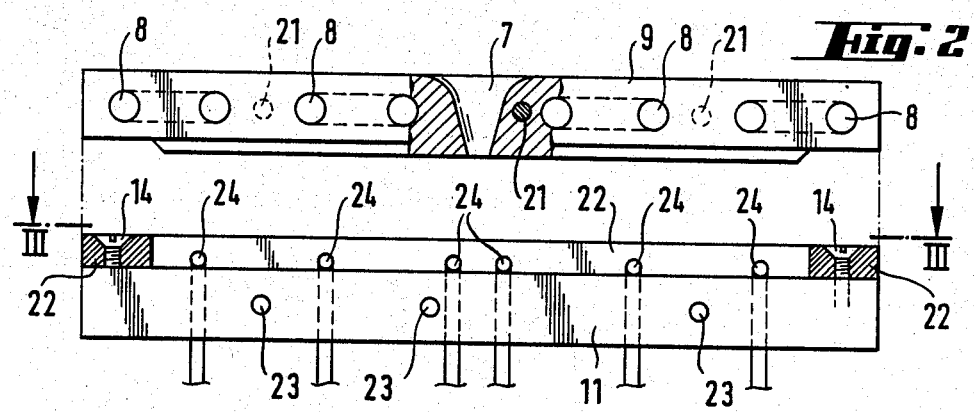
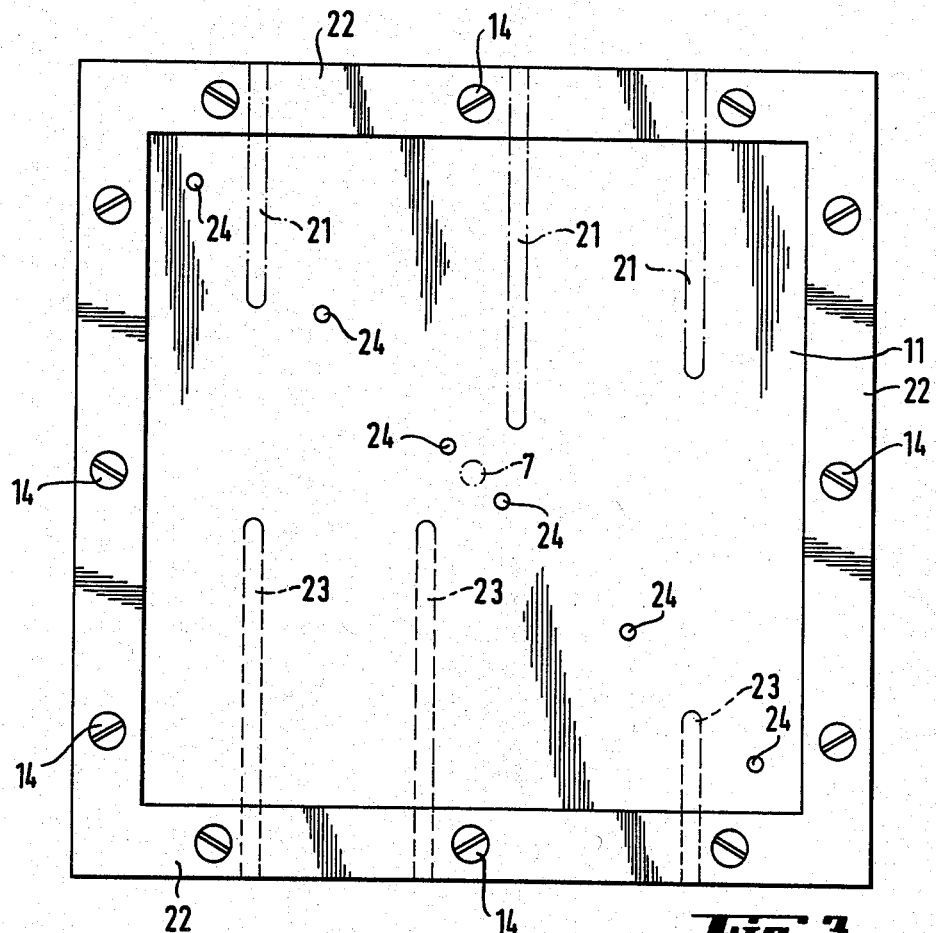

PRESSURE REACTION INJECTION MOLDING PROCESS FOR MAKING MOLDED BODIES OF THERMOSETS OPTIONALLY CONTAINING FILLER AND/OR REINFORCING MATERIAL

BACKGROUND OF THE INVENTION

This invention relates to a process of pressure reaction injection molding (PIM), from liquid reactive resin-forming starting material, molded bodies of thermosets (or "duroplastics") having from none to a major amount of filler and from none to an effective amount of reinforcing material.

The invention further relates to apparatus for carrying out the above-mentioned novel process in practice.

It is known to use injection molding techniques for producing shaped bodies of thermosets (duroplastic resin materials), also known as duromers such as urea-formaldehyde resins (UF), melamine-formaldehyde resins (MF), phenol-formaldehyde resins (PF), epoxide resins (EP) as well as unsaturated polyester resins (UP) such as those produced from diallyl phthalate (DAP). Thermosets ("duroplastics") are known to be formed from so-called reactive, hardenable (thermosetting) resins by irreversible cross-linking. Reactive, thermosetting resins are by definition liquid or liquefiable resins or mixtures of substances which are capable of hardening by polymerisation, polycondensation or polyaddition, per se or after adding reactants such as hardeners, accelerators and the like substances. As a rule injection molding and compression molding of thermosets (duroplastics) are carried out with adducts of resin and hardener or pre-reacted resins as starting materials. Thereby, less energy is released in the form of heat which must be dissipated. Moreover, the formal product shows less shrinkage.

It is also known to produce integral foams from polyurethanes (PUR) by means of reactive injection molding. In this process, large amounts of a multi-component system are quickly dosified and mixed, and the reaction mixture is then injected into the internal chamber of an injection mold and is hardened under pressure by the released foaming gases to afford the molded body.

In lieu of reactive resins, in particular epoxide resins, there can also be processed according to the reactive liquid injection (transfer) molding process (LIM), their monomers or, at most, their oligomers. Oligomers are, by definition, low molecular reactive resins having a molar mass of $10^2$ to $10^4$. Monomers or oligomers always contain large amounts of admixed or dissolved air. It is, therefore, difficult to produce completely air-free molded bodies consisting of thermosets (duroplastics) which are pure or contain filler and/or reinforcing agent, without deaeration.

The molds used in the known injection molding techniques for instance when flat discs or plates, e.g. grammophone record bodies are to be produced, usually consist of two mold halves, enclosing a reaction space when joined together with a tight seal, and it is conventional to maintain both mold halves at the same temperature during the hardening step of the mass injected through an orifice in one mold half.

By using pivotably mounted mold carriers the molds can be brought into a position which is most favorable for filling as well as the removal of released air. Moreover the filling holes can be arranged and dimensioned in a manner such that no air will be occluded and that a suitable filling rate can be attained. Nevertheless, difficulties are likely to occur which require deaeration under vacuum.

Due to the shrinking of the resin during the hardening reaction which may amount to about 1 to 10% of the total volume of the molded body, faults such as sink marks (caved-in areas or other shrinkage marks) may occur in the surface of the molded body. During the process of reactive injection transfer molding of formulated thermosets, it is, as a rule, not possible to eliminate these effects satisfactorily, merely by formation of adducts of resin and hardener or by prepolymerization of the resin, because such adducts or prepolymerizates have at room temperature higher viscosities or may even be solid, which fact renders turbulent mixing very difficult. Moreover the costs of raw materials are thereby increased.

A further drawback of the known process resides in a very considerable rise of the temperatures of the mass due to the exothermic nature of the hardening reaction; this may even lead to a decomposition of the molded body, unless relatively low starting temperatures are used which in turn leads to long reaction times In practice, there are mainly produced molded bodies containing filler or reinforced by glass fibers, and less frequently molded bodies which are free from fillers and reinforcing materials. Filler-containing molded bodies may contain up to 60 and more percent by weight of filler. The fillers cover up many deficiencies and have a favorable influence on the enthalpy of the hardening reaction and on shrinkage as they do not themselves participate in the hardening reaction. Glass fiber-reinforced molded bodies have much in common with molded bodies which are free from fillers and reinforcing materials, because they are transparent and any faults in their surface or in the interior of the molded bodies can be immediately detected. Also, such molded bodies free from fillers and reinforcing agents or molded bodies which are reinforced by glass fibers are particularly suitable for judging the quality of a molding technique.

In a known process, elongated bodies of synthetic resin material are produced in an upright mold in which the hardening temperature is applied in a region which is gradually moved from the bottom end upward, while fresh hardenable mass is added via the open top end of the mold. This process is not applicable to flat bodies such as plates or discs, e.g. grammophone records; in the latter case one flat side of the disc must be given very fine elevations and depressions in its surface which would be distorted or destroyed by the successively added mass.

It has now been found that other difficulties occurring when thermosets are produced in injection molding and, in particular, in the reactive liquid injection molding process, are due to the fact that hardening of the resin begins at the hot surface of the molded body, so that an outer hull of the molded body is already hardened while unhardened resin is still present at its core. When the resin in the interior of the molded body is hardened it will shrink, but, as the surface is already solidified, no further resin can reach the interior, and sink marks (caved-in areas of the molded body and other shrinkage marks) are the result.

OBJECTS AND SUMMARY OF THE INVENTION

It is, therefore, an object of the invention to provide a pressure reaction injection molding process which enables production of molded bodies from liquid polymerizable monomers, or oligomers, or reactive resins which will harden slowly or even rapidly to afford thermosets, and which may optionally contain fillers, while, optionally, reinforcing materials such as glass fibers or tissue may be introduced into the mold, the occurrence of the drawbacks described further above being thereby avoided.

It is another object of the invention to provide a process and apparatus for producing relatively thin plates having a relatively large face and serving for the manufacture of grammophone records and similar flat disks.

It is yet another object of the invention to provide a process and apparatus for the production of thermoset disks usable as grammophone records or the like, which disks have mechanical resistance properties, in particular resistance to bending, which are at least as good as the best disks made by conventional compression molding techniques.

These objects and others that will become apparent from the following description will be attained by carrying out the process of pressure reaction-injection molding molded bodies, including those having the shape of relatively thin plates, by injecting into a first one of two half spaces of a reaction space, e.g. of the hollow interior of a mold, through an entry zone in said first half space, a mass of a reactive hardenable resin system comprising hardener and a component selected from monomers, polymers and prepolymerizate of thermosetting resin, and more in particular of such thermosetting resin selected from epoxide resin and unsaturated polyester resin, and maintaining the temperature in the said first half space by at least 40 centigrades below the temperature in the other half space being remote from the said entry zone. By operating in this manner it is possible to intermittently or preferably continuously press additional hardenable mass of reactive resin system over the entire molded body into said reaction space and thereby to compensate practically completely any loss of volume of the molded body caused by shrinkage thereof during a hardening phase and avoiding the formation of sink marks.

We have further succeeded, by this novel process, in having the hardening reaction mass in the reaction space absorb the major portion of exothermy, thereby preventing the temperature of the reaction mass entering the first half space from attaining or even exceeding at any time the temperature of the molded and hardening mass in the second, hotter half space. It is thus possible to introduce the initial reaction mixture through the said entry zone at a considerably higher temperature than was possible in conventional liquid injection molding techniques, and thereby to shorten the hardening phase.

Preferably, the temperature difference between the temperatures applied to the first and the second half spaces, which amounts to at least 40 centigrades, is not above 180° C., and preferably not greater than 120 centigrades.

The temperatures of the hardenable starting compound, be it monomeric, oligomeric or a prepolymerizate, on the one hand, and of the hardener on the other hand, are separately adjusted to a desired tempered range of about 50° to 150° C., and preferably to 50° to 60° C., whereupon the two reactants are mixed with each other to form a homogeneous mixture.

The type of hardener used is conventional and does not appear to be particularly critical in obtaining a molded body of satisfactory properties. Aminoethyl piperazine or hydrogenated dimethyl-diamino-diphenylmethane (sold by Badische Anilin- und Soda-fabrik (BASF) AG, Ludwigshafen am Rhein, West Germany, under the tradename of Laromin C-260) have been used successfully as hardeners in the tests to be decribed further below.

Filler can be admixed with the mixture of reactive resin and hardener, for instance in an amount of up to 60% calculated on the total weight of the reaction mass consisting of reactive resin, hardener and filler.

The mixture of reactive resin, hardener and optionally filler is preferably deaerated, e.g. in a high vacuum (about $10^{-5}$ Torr) The last-mentioned two-component or three-component reaction mixture can be injected into the mold which can optionally contain reinforcing material such as glass fibers. The reinforcing material contained in the mold can amount, for instance, to 60 to 70% by weight calculated on the weight of the mixture of reactive resin and hardener.

The injection pressure is preferably maintained constant throughout the entire hardening phase; however it can be varied whenever necessary in order to compensate for weight loss of the mass and resulting shrinkage of the volume.

It is also preferred to maintain the internal pressure of the reaction space, e.g. the interior of the mold, prior to the gelling point, at a minimum value or higher, for instance, of 10 to 60 bar, and optionally at about 25 bar, so that a large portion of the volume loss by shrinkage is forestalled by compression of the reaction mass, and is compensated while the mass is still in a liquid state.

An apparatus for carrying out the process according to the invention comprises two half molds enclosing a reaction chamber when joined together, an inlet opening, in a first one of the two half molds, for the introduction of reactive resin or a mixture thereof with hardener and optionally filler, and temperature-adjusting means associated with the said first half mold and being adapted for heating and, in case of need, cooling the first half mold.

These temperature-adjusting means can consist essentially of heating coils having a heat transfer medium, e.g. a heating oil circulate therethrough.

As mentioned hereinbefore, it is conventional that both half molds are maintained during the hardening phase at the same constant temperature which prevails throughout the entire reaction chamber during that phase.

The simple inventive feature of providing for a temperature difference between two mold halves with that half mold which contains the entry means for the reactants being at a lower temperature, preferably of 40 to 180 centigrades below the temperature of the other half mold, affords the surprising advantage of producing unobjectionable mold bodies which reproduce the mold surfaces, provided in the two mold halves, in all details and with the greatest exactness.

Reactive resins for obtaining thermosets (duroplastics) which are especially suitable for use in the pressure reaction injection molding process are in particular epoxy resins.

The process according to the invention can be carried out in practice in the following manner:

Reactive resin and hardener are brought to a desired temperature, e.g. of 50° to 150° C. and mixed with each other. Optionally, filler substances are also admixed therewith. The mixture is then deaerated, for instance, in a high vacuum of $10^{-5}$ Torr, and is then injected into the mold. The mold can be charged with a reinforcing material, for instance in an amount of 60 to 70% by weight calculated on the total weight of the mixture consisting of reactive resin, hardener and optionally filler. The injection pressure is maintained during the entire hardening phase either constant (e.g. at 25 bar) or varied, in order to compensate for shrunken volume.

Furthermore, care is taken to maintain the internal pressure in the mold prior of the gelling point at a value being not lower than a minimum pressure, e.g., of 10 to 60 bar, and preferably of 25 to 35 bar, so that, by compression of the mass, a large portion of the shrinkage after the gelling point will be anticipated and already compensated while the mass is still in a liquid state.

It was found that surprisingly, in spite of the considerable temperature difference between the two half molds, which is to be maintained in accordance with the invention, the temperature of the mass, and also of the molded body, in the interior of the reaction space or mold is only about 2 to 5 centigrades below the higher temperature applied to the second half space or half mold; and is substantially the same in all parts of the molded body. This is taken into account when determining and controlling the hardening temperature in the entire reaction space, and due to this unexpected behavior, internal tensions and stresses in the molded body are avoided and its mechanical resistance to stress is improved.

Preferred temperature differences between the upper and the lower half mold are in the range of from 55° to 120°1 C.

During the introduction of the reaction mass into the mold, its temperature is preferably kept at 50° to 60° C.

BRIEF DESCRIPTION OF THE DRAWINGS

Further details and advantages of the invention will become apparent from the following description thereof with reference to the accompanying drawings in which

FIG. 2 shows on an enlarged scale in lateral, partially sectional view a preferred embodiment of the same mold being present in the apparatus of FIG. 1; and FIG. 3 is a top view of the lower half mold of the embodiment of the mold shown in FIG. 2 and taken in a plane indicated by III—III in the last-mentioned Figure.

DETAILED DESCRIPTION OF THE EMBODIMENT SHOWN IN THE DRAWINGS

Figure 1:
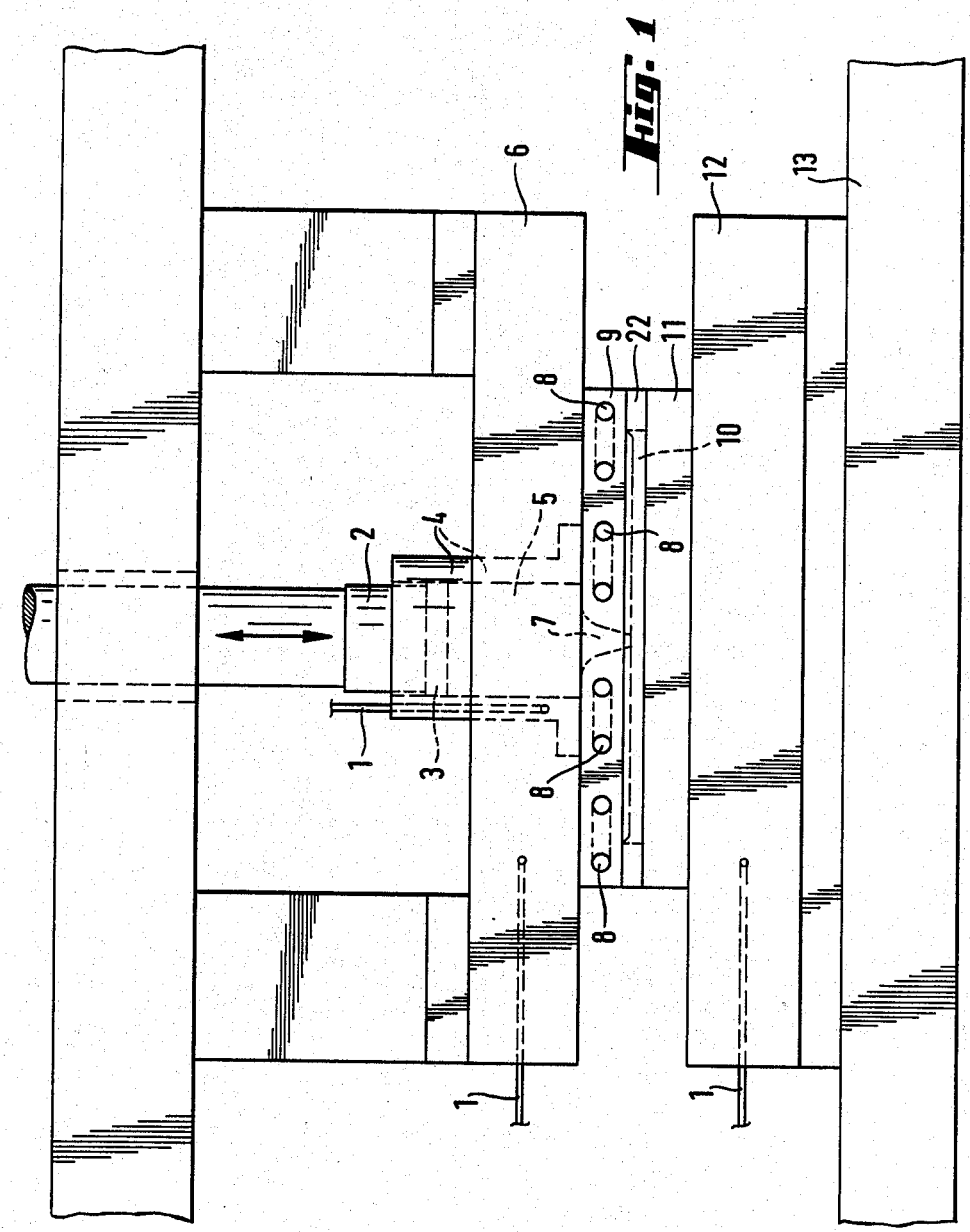
FIG. 1 represents schematically in a lateral view an apparatus according to the invention.

In FIG. 1, there is shown a modified commercially available injection molding transfer press of the type KHC-50 sold by Bucher-Guyer AG, of Niederwenigen, Switzerland, which is equipped with means for adjustable injection pressure and controllable closing pressure. Reference numeral 1 designates temperature control points at the transfer cylinder 4, in the upper heating platen 6 and in the lower heating platen 12 of the press. The transfer piston is designated by the reference numeral 2, a sealing disk, e.g. a silicone caoutchouc stopper, by 3, the transfer space by 5 and the injection orifice by 7. The molding tool comprises an upper half mold 9 which is provided with the injection orifice 7, and a lower half mold 11. The square plate-shaped molded body 10 is produced in the reaction space enclosed by the two halves 9 and 11. The upper half mold 9 is equipped with heating coils 8 through which oil circulates as the heating fluid. The lower half mold 11 is heated by means of the heating plate 12 of the press, which plate rests on the press table 13. The reference numeral 22 designates a spacer frame which is interposed between the two mold halves 9 and 11.

In FIG. 2 there is shown the molding tool comprising the upper half mold 9, containing the injection orifice 7, and the lower half mold 11. The temperature of the upper half mold 9 is measured by thermoelements 21. Between the two mold halves 9 and 11 there is interposed the spacer frame 22 which is fastened on the margin of the lower half mold 11 by means of screw bolts 14, as shown in the top view thereof in FIG. 3. Thermoelements 23 are introduced into the mold half 11 by way of the sidewall of the latter, and measure the temperature of that mold half. Thermosensors 24 penetrate through the mold half 11 upwardly to come into contact with the reaction mass in the space provided inside the spacer frame 22, and are so distributed that they measure the temperature of the reaction mass, over the entire volume of the molded body being formed.

EXAMPLES

The apparatus shown in FIGS. 1 to 3 of the drawings has been used to carry out tests with a heat-hardenable epoxide resin, namely, Araldite GY 250, supra, produced by Ciba-Geigy AG, Basel, Switzerland and the hardener, sold under the trade name Laromin C-260 by BASF, supra; as well as other tests producing anhydride-hardened and catalytically hardened epoxide resin systems, and also with unsaturated polyester resins, which tests confirmed the favorable results obtained by the process, and in the apparatus, according to the invention. Temperature differences between the first and the second half mold were kept in the range of from 40 to 120 centigrades, and the half mold remote from the injection opening was kept at the critical hardening temperature, depending on the reactive resin and hardener mixture used. A molded body of unsatisfactory surface aspect is an indication that the temperature applied in that half mold which contains the entry opening is too high and must be lowered relative to the temperature of the other half mold.

In the examples and comparative tests described further below the following conditions were kept constant:
 closing pressure: 60 bar
 injection pressure: 10 bar.

Initially, the internal pressure in the transfer tool is at about 35 bar and decreases during the hardening phase down to a few bar, e.g. 5 to 7 bar. The injection speed was chosen in a manner such that the mold was filled in about 15 seconds. As a separating agent there was used a solution of silicone oil having a viscosity of about 5000 cP in sangayol (weight ratio about 49:51).

As half molds there were used platens made of polished tool steel and having each a recess or cavity of 200 mm×200 mm and a depth of 2 mm, affording a combined height of 4 mm when the two halves were joined together to enclose a reaction chamber of 160 cm³.

The reactive resin and the hardener were tempered in a drying chamber at 50° to 60° C. The simultaneously, but separately tempered components were then mixed with each other, optionally with the addition of filler, until a homogeneous mixture was obtained. A small amount of 2-nitropropane defoamer was then added in the usual manner and stirring was continued until the mixture was again homogeneous.

The thus obtained mixture was then deaerated under vacuum (about $10^{-5}$ Torr) until no more foaming occurred.

In order to be able to maintain the chosen temperature differences the mold was assembled only a short time before injection, and was subjected to the above-stated closing pressure. A piece of filter paper (not shown) was inserted between the upper face of the upper half mold 9 and a transfer chamber 5, across the entry orifice 7. Thereby, the mixture of reactive resin, hardener, and optionally filler, will enter the mold only upon increase of the pressure exerted by the injection piston 2 and will be exposed to hardening temperature only when in the mold. However, in industrial practice, a conventional slide valve or the like device take the place of the filter paper.

The mixture of reactive resin, hardener and optionally filler and further conventional adjuvants such as wetting agents and deforming agents was poured into the transfer chamber 5, the top opening of which was then closed off with a silicone caoutchouc stopper 3. The mixture was then injected into the mold by means of the injection piston 2. After the mold interior had been filled, an injection pressure calculated in a conventional manner from the characteristic data of the resin was then maintained during the entire hardening phase.

After hardening is completed, the pressure is relieved and the formed body is removed from the mold. If it is still soft, i.e. if the temperature of the molded mass is still higher than the vitrification temperature, the molded body is cooled down in a tridimensional cooling frame or pattern. After cooling off, the quality of the surface of the molded body is evaluated. The molded bodies thus obtained were thin square plates having the dimensions of 20 cm×20 cm×0.4 cm.

In the following tables there are summarized the results of three different test series which comprise working examples according to the invention and comparative tests. The following abbreviations are used in the tables; all temperatures are given in ° C., all temperature differences in centigrades.

| Ex. | working example according to the invention, or close to the same. |
| --- | --- |
| C.T. | comparative test |
| $T_{wl}$ | temperature of the lower half mold 11 |
| $T_{wu}$ | temperature of the upper half mold 9 |
| $\Delta T_w$ | difference between the temperature of the upper and lower half molds (in centigrades) |
| $T_{max,l}$ | maximum temperature of the mass at the lower surface region |
| $T_{max,u}$ | maximum temperature of the mass at the upper surface region |
| $\Delta T_{max}$ | temperature difference between the upper and lower surface regions of the mass (in centigrades) |
| comp. V (%) | compensated volume of the molded body (in per cent of the total volume of the finished molded body). When the reaction chamber in the mold has been filled completely with the reaction mixture, prior to the hardening phase, the injection piston 2 comes to a standstill, but will continue its downward displacement as the hardening reaction progresses. From this additional downward path of the piston 2 in the chamber 5 and from the area of the piston face there can be calculated the additionally displaced volume in the chamber 5 and also the aforesaid compensated volume. |
| Weight (g) | Weight of the molded body (in these experiments a flat disk), after cooling |
| App. | Appearance of the molded body (flat disk) after cooling evaluated according to the following scale: |
| ++ | the shaped body has an unobjectionable surface, |
| + | the surface of the shaped body shows only a few shrinkage marks, |
| − | the surface of the molded body shows many shrinkage marks and moreover has some caved-in areas, |
| − − | the surface of the molded body shows many shrinkage marks and many caved-in areas and moreover injection of an excessive amount of reactive mixture. |

FIRST TEST SERIES

Molded bodies were produced from an epoxide resin system consisting of

| | |
| --- | --- |
| 153 g | of heat-hardenable epoxide resin (Araldit GY 250) |
| 49 g | of hardener (Laromin C-260) |
| 248 g | of filler (quartz flour EL 45 sold by Sihelco AG, Birsfelden, Switzerland) |
| 450 g | weight of system |

0.3 g of 2-nitropropane as defoamer were added.

The filling temperature of the reactive mixture into the reaction chamber of the mold was 50° to 60° C., the temperature prevailing throughout the mass and, subsequently, the molded body, was about 2 to 5 centigrades below the temperature given in the column headed $T_{max,l}$.

The results of this Test Series are compiled in the following Table I:

TABLE I

| | $T_{wl}$ (°C.) | $T_{wu}$ (°C.) | $\Delta T_w$ | $T_{max,l}$ (°C.) | $T_{max,u}$ (°C.) | $\Delta T_{max}$ | Comp. Volume (%) | Weight (g) | App. |
| --- | --- | --- | --- | --- | --- | --- | --- | --- | --- |
| C.T. 1 | 155 | 155 | 0 | 158.3 | 159.4 | (−) 1.1 | — | 241.3 | + |
| C.T. 2 | 165 | 165 | 0 | 168.2 | 168.4 | (−) 0.2 | 1.8 | 241.2 | + |
| Ex. 1 | 200 | 135 | 65 | 195.3 | 192.7 | 2.6 | 3.06 | 241.8 | ++ |
| Ex. 2 | 200 | 145 | 55 | 195.7 | 193.3 | 2.4 | 2.73 | 241.5 | ++ |
| Ex. 3 | 200 | 155 | 45 | 197.7 | 195.7 | 2.0 | 2.14 | 240.5 | + |
| Ex. 4 | 200 | 165 | 35 | 200.0 | 198.6 | 1.4 | 1.85 | 239.4 | − − |
| Ex. 5 | 200 | 175 | 25 | 201.8 | 200.8 | 1.0 | 1.33 | 239.2 | − − |

The temperature prevailing throughout the mass and, subsequently, the molded body was about 155° C. in C.T. 1, about 163-166° C. in C.T. 2 and about 190 to 198 in Examples 1 to 5. The length of the hardening phase was about 10 to 12 minutes in the comparative tests C.T. 1 and C.T. 2, and about 4 to 5 minutes in the case of Examples 1 to 5.

The data in Table I show, that, in the comparative tests C.T.1 and C.T.2 in which the temperature difference between the two half molds is zero, the shrinkage is not compensated at all (C.T.1) or only to a very small The results of this Test Series are compiled in the following Table II:

TABLE II

|       | $T_{wl}$ (°C.) | $T_{wu}$ (°C.) | $\Delta T_w$ | $T_{max,l}$ (°C.) | $T_{max,u}$ (°C.) | $\Delta T_{max}$ | Com. Volume (%) | Weight (g) | App. |
|-------|------|------|------|--------|--------|--------|------|-------|------|
| C.T. 3  | 120 | 120 | 0  | 122.2 | 122.7 | (−) 0.5 | 4.24 | 175.0 | −    |
| C.T. 4  | 130 | 130 | 0  | 133.4 | 134.4 | (−) 0.6 | 3.36 | 174.6 | −    |
| C.T. 5  | 140 | 140 | 0  | 143.0 | 143.3 | (−) 0.3 | —    | 174.4 | −    |
| C.T. 6  | 150 | 150 | 0  | 152.3 | 152.8 | (−) 0.5 | 2.8  | 173.7 | − −  |
| C.T. 7  | 160 | 160 | 0  | 161.4 | 162.3 | (−) 0.9 | 2.06 | 173.8 | − −  |
| C.T. 8  | 180 | 180 | 0  | 179.5 | 182.0 | (−) 2.5 | 2.38 | —     | − −  |
| C.T. 9  | 200 | 200 | 0  | 193.0 | 195.5 | (−) 2.5 | 0.45 | —     | − −  |
| C.T. 10 | 220 | 220 | 0  | 209.8 | 223.5 | (−) 3.7 | 1.26 | —     | − −  |
| Ex. 6   | 200 | 117 | 83 | 196.2 | 192.4 | 3.8     | 3.23 | 175.3 | + +  |
| Ex. 7   | 200 | 127 | 73 | 199.2 | 196.7 | 2.5     | 3.18 | 174.7 | + +  |
| Ex. 8   | 200 | 136 | 64 | 200.6 | 198.4 | 2.2     | 2.26 | 174.6 | + +  |
| Ex. 9   | 200 | 147 | 53 | 200.5 | 198.8 | 1.7     | 2.2  | 173.5 | −    |
| Ex. 10  | 200 | 160 | 40 | 202.6 | 201.2 | 1.4     | 2.03 | 173.0 | − −  |
| Ex. 11  | 200 | 170 | 30 | 202.2 | 202.8 | (−) 0.6 | 0.56 | 172.5 | − −  | degree (C.T.2) and the appearance of the surface of the molded body is unsatisfactory. Another drawback resides in the fact that hardening at the low temperatures is very slow, the hardening mass, in C.T.1 and C.T.2 attaining in the lower and upper half mold only a $T_{max}$ of about 158° and 168°, respectively. The temperature is maintained uniform throughout the entire injection and hardening phase at about the same level as the introduction temperature.

The Working Examples 1 to 5 reveal that the results are the better, the greater the temperature difference between the two half molds. In the case of the greater temperature differences, a larger portion of shrinkage is compensated and the surface of the molded body also shows a better appearance. However, when the temperature difference between the first and the second mold halves is smaller than 40 centigrades (Examples 4 and 5) the results, especially the appearance, are even worse than in the case of the conventional comparative tests.

As another advantage revealed by the working examples according to the invention, the temperature of the lower half mold is kept much higher, namely at about 195°–196° C., resulting in much faster hardening of the mass.

SECOND TEST SERIES

Molded bodies are produced from a heat-hardenable system similar to that used in the first test series, but free from filler, and having the following composition:

| 265 g of reactive resin (Araldit GY 250) |
| 85 g of hardener (Laromin C-260) |
| 350 g |

0.3 g of defoamer are added to the homogeneous mixture, and the filling temperature was 50° to 60° C.

As Table II reveals, the comparative tests C.T.3 and C.T.5 to C.T.7 in which the temperature difference between the two half molds is zero, afford a similar, (or in the case of C.T.3 even a greater) degree of compensation of the shrinkage as is obtained in the case of Examples 1 to 3 of the First Test Series, but that the appearance of the body surface is unsatisfactory, and completely so when the temperature in the entire mold is high (180° to 220° C.) which leads to an accelerated hardening of the molded mass, desirable though this would be in itself.

Examples 6 to 8 confirm that the compensation of shrinkage and the appearance of the molded bodies obtained improve with larger temperature differences between the first and second half mold. However, in the case of Examples 9, 10 and 11 a temperature difference of 53 centigrades or less leads to unsatisfactory surface appearance, which is no better than in the case of Comparative Tests C.T.6 to C.T.10, while the compensation of shrinkage is particularly unsatisfactory when the temperature difference between the two half molds is less than 40 centigrades (Example 11).

THIRD TEST SERIES

Molded bodies were produced from a cold-hardening epoxide resin system consisting of 284 g of Araldit GY 250 as the reactive resin component and 66 g of aminoethylpiperazine as the hardener. 0.3 g of defoamer were added to the resulting 350 g of reactive mixture which did not contain any filler material. The temperature of the mass being filled into the mold was only about 30° C. The temperature of the lower half mold remote from the entry orifice was kept at 120° to 140° C., as this resin system could even be hardened slowly at room temperature.

The test results are compiled in the following Table III.

TABLE III

|         | $T_{wl}$ (°C.) | $T_{wu}$ (°C.) | $\Delta T_w$ | $T_{max,l}$ (°C.) | $T_{max,u}$ (°C.) | $\Delta T_{max}$ | Comp. Volume (%) | Weight (g) | App. |
|---------|------|------|-----|-------|-------|---------|------|-------|-----|
| C.T. 11 | 120  | 120  | 0   | 126.0 | 129.5 | (−) 3.5 | 1.92 | 180.4 | −   |
| C.T. 12 | 130  | 130  | 0   | 134.3 | 137.7 | (−) 3.4 | 0.73 | 180.9 | − − |
| Ex. 12  | 130  | 100  | 30  | 133.6 | 137.0 | (−) 3.4 | 0.67 | 182.6 | −   |
| Ex. 13  | 130  | 70   | 60  | 129.6 | 135.0 | (−) 5.4 | 4.37 | 184.7 | −   |
| Ex. 14  | 130  | 50   | 80  | 133.1 | 134.6 | (−) 1.5 | —    | 184.0 | −   |
| Ex. 15  | 130  | 40   | 90  | 129.7 | 130.9 | (−) 1.2 | 4.87 | 185.4 | −   |
| Ex. 16  | 130  | 25   | 105 | 131.0 | 131.0 | 0       | 4.91 | 186.0 | + + |
| Ex. 17  | 120  | 50   | 70  | 121.4 | 122.5 | (−) 1.1 | 4.87 | 185.9 | −   |
| Ex. 18  | 120  | 30   | 90  | 120   | 120   | 0       | 4.95 | 186.3 | + + |

TABLE III-continued

| | $T_{w,l}$ (°C.) | $T_{w,u}$ (°C.) | $\Delta T_w$ | $T_{max,l}$ (°C.) | $T_{max,u}$ (°C.) | $\Delta T_{max}$ | Comp. Volume (%) | Weight (g) | App. |
|---|---|---|---|---|---|---|---|---|---|
| Ex. 19 | 140 | 25 | 115 | 136.9 | 136.0 | 0.9 | 3.59 | 185.5 | ++ |

Table III reveals that in comparative tests C.T.8 and C.T.9 in which the temperature difference is zero, only a relative small compensation of the shrinkage of the molded body is achieved while the appearance of the body surface is unsatisfactory.

Moreover, it is shown by the results obtained in Working Examples 12 to 19 that a satisfactory appearance of the body surface is obtained in this case of using a cold-hardening resin system only when the temperature difference between the first and second half molds is a much larger one than in the first and second test series, namely above 80 centigrades while the compensation of shrinkage is a much greater one than in the case of the comparative tests, and is achieved already when the temperature difference between the two half molds is less than 40 centigrades. The compensation value is unsatisfactory only in Example 12 in which that temperature difference is only 30 centigrades.

EXAMPLE 20

Molded bodies were produced from the heat-hardening epoxide resin system consisting of a mixture of 227 g of Araldit GY 250 and 73 g of the hardener sold as Laromin C-260. The mold was charged before curing with 12 layers of a glass fiber web weighing 184.8 g. 2-Nitropropane was added to the homogeneous mixture of reactive resin and hardener in an amount of 0.3 g, and the temperature of the mass during filling was kept at 50° to 60° C.

The following data were noted:

| | |
|---|---|
| $T_{w,l}$ | 200° C. |
| $T_{w,u}$ | 135° C. |
| $\Delta T_w$ | 65 centigrades |
| $T_{max,l}$ | 197.5° C. |
| $\Delta T_{max}$ | 4.3 centigrades |
| Compensated Volume | 2.17% |
| Weight | 238.6 g |
| Appearance | ++ |

The produced plate-shaped bodies had an objectionable surface and showed a bending resistance (DIN 53452) of 918.5 N/mm².

Plates having a thickness of 10 mm instead of 4 mm could be produced in the same manner as described hereinbefore with equally satisfactory compensation of shrinkage and unobjectionable quality.

Similar results as described in the preceding Examples are obtained when replacing the heat-hardenable epoxide resin used therein by an unsaturated polyester resin such as Palatal P8 or Palatal E-200 sold by BASF, supra, or mixtures of these resins.

Plates and discs obtained by the process according to the invention have an unobjectionable surface and are free from occlusions of air. The bending strength of the glass fiber-reinforced plates and discs is at least equal to that of the best products available in the market.

In particular, fine depressions and elevations in the plate surface, which had been in contact with the lower half mold, are faithfully reproduced.

The term "pre-polymer material" used in the claims is intended to comprise monomers, oligomers and more highly polymerized, still hardenable resins.

We claim:

1. In a pressure reaction injection molding process for manufacturing a molded body of thermoset material by introducing into a mold a reactive mixture of thermosetting pre-polymer material, hardening agent and from 0% by weight to an effective property enhancing amount of filler, heating the material in the mold to hardening temperature, and adding fresh material to the mass during the hardening phase thereof, the improvement comprising carrying out the aforesaid steps in a mold consisting essentially of an upper half and a lower half and an inlet opening downwardly through the upper half into the and, during the hardening phase, while introducing said fresh material under pressure into the mold through said inlet, maintaining the temperature of the upper half substantially below the hardening temperature of the reactive mixture and maintaining the temperature of the lower half at least at such hardening temperature, thereby compensating practically completely for any loss of volume in the molded body caused by shrinkage thereof during the hardening phase.

2. The improvement of claim 1, wherein the temperature difference between the upper and lower mold halves amounts to from 40 to 180 degrees centigrade.

3. The improvement of claim 1, wherein the temperature difference between the upper and lower mold halves amounts to from 40 to 120 degrees centigrade.

4. The improvement of claim 1, wherein the thermosetting resin is an epoxy resin, polyurethane resin or unsaturated polyester resin.

5. The improvement of claim 1, wherein the thermosetting resin and the hardening agent are separately heated to a filling-in temperature of from about 50° to 150° C., are homogeneously mixed with each other and are then introduced into the inlet.

6. The improvement of claim 5, wherein the temperature to which the thermosetting resin and the hardening agent are separately heated, is in the range of from 50° to 60° C.

7. The improvement of claim 4, wherein filler in an effective amount up to 60% of the weight of the mixture is added to the reactive mixture.

8. The improvement of claim 5, wherein the reactive mixture is dearated.

9. The improvement of claim 8, wherein the dearation of the reactive mixture is carried out under high vacuum.

10. The improvement of claim 5, further comprising the step of introducing an effective strength enhancing amount of a reinforcing agent into the mold prior to introducing the reactive mixture thereinto.

11. The improvement of claim 10, wherein the amount of reinforcing agent is in the range of 60 to 70% of the combined weight of thermosetting resin and hardening agent.

12. The improvement of claim 1, wherein the injection pressure on the material being introduced is maintained and varied during the entire hardening phase in a manner such as to compensate for loss of volume occurring due to hardening of the mass in the mold.

13. The improvement of claim 12, wherein the internal pressure in the mold during the introduction of fresh material and prior to the gelling point, is maintained at a minimum value of about 10 to 60 bar.

14. The improvement of claim 13, wherein the internal pressure prior to the gelling point is maintained at about 25 bar.

* * * * *